J. CAMPBELL.
Churn.

No. 8,293. Reissued June 18, 1878.

Witnesses:
P. Dieterich
Frank A. Duffy

Inventor:
John Campbell.
Per C. H. Watson & Co. Attorneys.

N. PETERS, PHOTO-LITHOGRAPHER, WASHINGTON, D. C.

UNITED STATES PATENT OFFICE.

JOHN CAMPBELL, OF ALMONTE, ONTARIO, CANADA.

IMPROVEMENT IN CHURNS.

Specification forming part of Letters Patent No. 181,311, dated August 22, 1876; Reissue No. 8,293, dated June 18, 1878; application filed June 6, 1878.

*To all whom it may concern:*

Be it known that I, JOHN CAMPBELL, of Almonte, in the county of Lanark and Province of Ontario, Canada, have invented certain new and useful Improvements in Churns; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
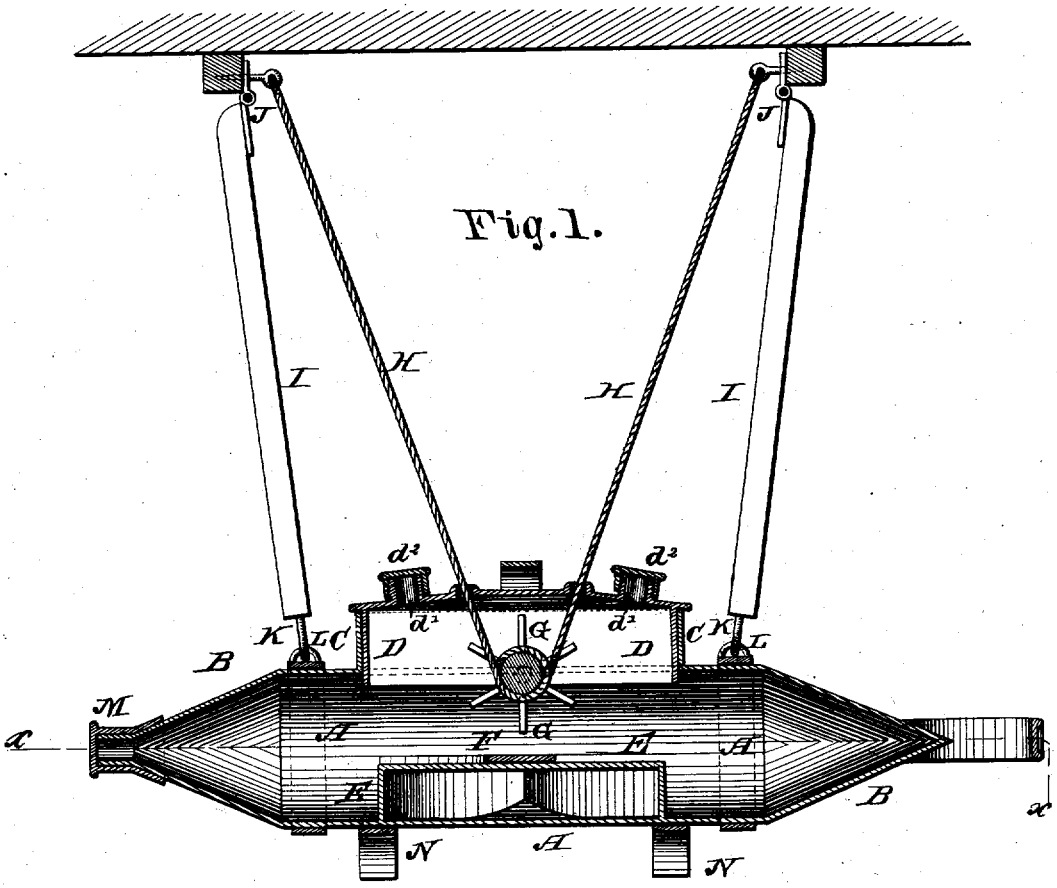
Figure 2:
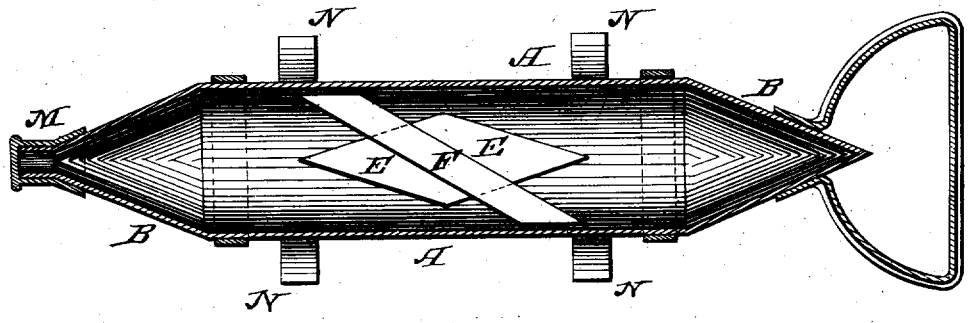

In the annexed drawing, Figure 1 is a longitudinal section of my churn. Fig. 2 is a horizontal section of the same on the line *x x*, Fig. 1.

My invention relates to the class of churns that are operated pendulously; and it consists of a chamber terminating in pointed ends, and provided with a fixed cream-breaker and knife for rupturing the butter globules of the cream, revolving paddle-wheels for agitating the cream, and ventilating-apertures for aerating the cream and carrying off the impure air and gases therefrom, the chamber being suspended by means of hinged links or bars, as herein shown and described, to prevent any lateral movement of the chamber.

A represents a cylindrical chamber, terminating in the conical ends B, which, for the purpose of facilitating its construction, I preferably make of sheet metal. On its upper side an elongated opening, C, is made, for the purpose of pouring the cream into, and removing the butter from, the churn. It is provided with the closely-fitting cover D, having near each of its ends an air-opening, $d^1$, for the induction and eduction of air as the cream is passed from end to end of the chamber in the operation of churning. These openings are provided with the caps $d^2$, for excluding the dust when the churn is out of use.

E is a diamond-shaped block or cream-breaker, secured at the bottom of the chamber A, for the purpose of breaking the butter globules. In performing this office it is materially aided by the diagonal knife F, secured to its upper side.

G is a paddle-wheel, whose shaft has its bearings in the rim of the cover D. It receives its motion by means of the cord H, whose ends are secured at or near the points from which the cylinder A is suspended, and from thence passing downward through apertures in the cover D. One or more turns of the cord pass around the shaft of the paddle-wheel, so that with each endwise movement of the cylinder the length of the cord between the shaft and the points of its attachment is alternately lengthened and shortened, and thereby the paddle-wheel is revolved back and forth with each swing of the churn.

The cylinder or chamber A is suspended by means of the bars I to a frame-work or ceiling, to which they are connected by the hinges J, to prevent any lateral motion being imparted to the bars. At their lower ends the bars I are provided with hooks K, for engaging in the eyes L of the chamber A, to sustain its weight and afford a ready means for disengaging the cylinder from its place when necessary. M is a closed discharge-opening, made at the apex of one of the conical ends B, for emptying the buttermilk from the chamber A. N N are legs secured to the chamber, for keeping it in position when removed from its hangings.

In churning, a sufficient quantity of cream is placed within the chamber A to fill about one-half of the chamber. The caps $d^2$ are removed from the air-openings $d^1$, for the free admission of fresh air into the chamber and the escape of the impure air and gases therefrom. A steady pendulous motion is then imparted to the churn, and the cream contained therein is dashed from one end of the chamber to the other, striking violently in its course against the cream-breaker E and knife F, and thence into the conical ends of the chamber, into whose contracted areas it is driven with such force that the caseous covering or cell-walls of the butter-globules are ruptured in a very rapid and efficient manner. This effect is produced by the globules striking against the surface of the conical ends of the chamber, and by the forcible contact of the globules with each other when dashed into the contracted ends of the churn.

The motion of the cream in the chamber expels the air through the opening $d^1$ from the end of the chamber toward which the mass is moving, and fills the opposite end of the chamber with a supply of fresh air through the other opening.

The swinging motion in a vessel formed with conical, conoidal, semi-globular, or pyramidal ends causes the cream or milk to flow toward either end alternately, to be contracted or condensed into a stream, which rises and is returned, flowing very rapidly near the top of the churn at the ends, where it is spread out into a thin film, and then falls with a dash into the bottom of the churn at the opposite end, the cream or milk forming, as it were, a falls stream or current in the shape of a figure 8 or ∞.

The extreme points of the ends are out of the current and form a sort of head, against which, however, the masses of butter, when formed, are not beaten into balls or cakes. This rapid stream of liquid, passing close to the openings in the top, causes an induced current of air to accompany and follow the cream or milk, and to become mingled with it subsequently. The peculiar action of this agitation, aided by the action of the air, causes the butter to come or form out of the liquid in the shape of small globules, which become aggregated by very slight cohesion into masses floating in the buttermilk. These masses are not beaten, as by dashers, nor pressed against the sides of the churn, as by revolving paddles, nor are they dashed against the ends or sides, as in oscillating churns having square or abrupt ends, but retain their grain-like form, like agglomerations of mustard-seeds.

The shape of the churn and the peculiar flow of the liquid agitated in it makes it impossible to overchurn—that is, to injure the grain of the butter by long churning.

The paddle or agitating wheel G, by its rotatory motions, aids in keeping the cream in the chamber in a state of agitation.

It is manifest that butter may be churned by means of the chamber, when made with pointed ends, without the aid of a cream-breaker, E, knife F, and agitating-wheel G, or by omitting either of them, and my invention embraces such modifications, but these devices aid so greatly in reducing the time required for churning the butter, and in increasing the amount produced from a given quantity of cream, that I preferably construct my churns with them.

Having thus fully described my invention, what I claim as new, and desire to secure by Letters Patent, is—

1. In a swinging churn, a chamber, A, having ends contracted to, or nearly to, a point, substantially as described.

2. In a swinging churn, a chamber, A, having ends contracted to, or nearly to, a point, in combination with the breaker E.

3. The chamber A, having conical ends B, cream-breaker E, and knife F, constructed and arranged to operate as and for the purpose herein specified.

4. The combination, with the cylindrical chamber A, cream-breaker E, and knife F, of the agitating-wheel G, as and for the purpose herein specified.

5. In a pendulously-operating churn, the combination, with the chamber A, cream-breaker E, and knife F, of the cover D, provided with the air-openings $d^1$ and agitating-wheel G, when constructed and arranged to operate as and for the purposes herein specified.

6. A churn having its ends contracted to, or nearly to, a point, and having an opening for filling and discharging the churn, and provided with an adjustable cover, for the purposes set forth.

In testimony that I claim the foregoing I have hereunto set my hand this 29th day of May, 1878.

JOHN CAMPBELL.

Witnesses:

JOSEPH H. LEGGATT,

M. C. WELD.